(12) United States Patent
Picard et al.

(10) Patent No.: US 10,705,857 B2
(45) Date of Patent: Jul. 7, 2020

(54) INITIALISING OPERATIONS SUPPORT SYSTEMS

(71) Applicant: HEWLETT PACKARD ENTERPRISE DEVELOPMENT LP, Houston, TX (US)

(72) Inventors: Jean-Charles Picard, Mougins (FR); Nicolas Donato, Mougins (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 147 days.

(21) Appl. No.: 15/961,873

(22) Filed: Apr. 25, 2018

(65) Prior Publication Data

US 2019/0332397 A1 Oct. 31, 2019

(51) Int. Cl.
*G06F 9/445* (2018.01)
*G06F 11/07* (2006.01)
*G06F 9/451* (2018.01)

(52) U.S. Cl.
CPC ...... *G06F 9/44578* (2013.01); *G06F 9/44526* (2013.01); *G06F 9/453* (2018.02); *G06F 11/0706* (2013.01)

(58) Field of Classification Search
CPC .. G06F 6/445; G06F 9/44505; G06F 9/44526; G06F 9/44578
See application file for complete search history.

(56) References Cited

U.S. PATENT DOCUMENTS

| | | | |
|---|---|---|---|
| 8,533,336 B1 | 9/2013 | Scheffler et al. | |
| 8,839,234 B1* | 9/2014 | Voronkov | G06F 8/61 717/172 |
| 8,893,117 B2 | 11/2014 | Gaither et al. | |
| 9,229,694 B2 | 1/2016 | O'Rourke et al. | |
| 9,535,726 B2 | 1/2017 | Lagerblad et al. | |
| 2005/0132179 A1* | 6/2005 | Glaum | G06F 11/1433 713/1 |
| 2009/0183150 A1* | 7/2009 | Felts | G06F 8/60 717/173 |
| 2011/0016477 A1 | 1/2011 | Schechter et al. | |
| 2013/0212465 A1 | 8/2013 | Kovatch | |
| 2014/0181801 A1* | 6/2014 | Voronkov | G06F 8/61 717/177 |

(Continued)

OTHER PUBLICATIONS

James Mickens and Mohan Dhawan, "Atlantis: Robust, Extensible Execution Environments for Web Applications," SOSP'11, Oct. 2011, pp. 217-231, ACM.

(Continued)

*Primary Examiner* — Glenn A. Auve

(57) ABSTRACT

In an example, a method includes, in initialising an operations support system providing a common access point to a plurality of data services, accessing a list of modules, each module relating to at least one of the plurality of data services to be accessed via the common access point. A list of at least one processed modules data file may also be accessed, wherein each processed modules data file comprises bundled modules. The processed modules data files may be requested and a first module from the list of modules which is not part of a processed modules data file may be identified. At least one processed modules data file and the first module may be loaded to provide the operations support system.

15 Claims, 3 Drawing Sheets

(56) References Cited

U.S. PATENT DOCUMENTS

2015/0089031 A1* 3/2015 Kalali .................... H04L 67/34
709/220
2017/0075669 A1* 3/2017 Charters .................. G06F 8/60

OTHER PUBLICATIONS

Thoughtfarmer, "Deferred JavaScript Loading," 2015, pp. 1-3 (online), Retrieved from the Internet on Nov. 11, 2017 at URL: <documentation.thoughtfarmer.com/documentation/17837/deferred-javascript-loading>.

* cited by examiner

INITIALISING OPERATIONS SUPPORT SYSTEMS

BACKGROUND

In some examples, an interface (e.g. a web interface) may provide a user interface for a plurality of services, which may comprise data services. For example, a Graphical User Interface (GUI) may be provided to assist a user in accessing services provided by an operations support system, for example comprising content management systems.

BRIEF DESCRIPTION OF DRAWINGS

Non-limiting examples will now be described with reference to the accompanying drawings, in which.

DETAILED DESCRIPTION

The following discussion is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to. The term "based on" means based at least in part on.

In some examples herein, it may be intended to provide a common framework to provide access to multiple data services. In some examples, a modular architecture may be adopted in which modules can be added or removed from the framework, or modified and/or replaced, to extend or change the accessible data services.

Computing devices and systems may be used to provide access to data services. Data services may be provided as part of management systems, accounting systems, control systems, messaging systems, firewall and security systems and other event management systems, authentication systems or the like. Measurement or sensor systems such as probes or networks of probes are also examples of possible data services. Where a plurality of data services are provided by a common access point, such as a web interface, these may be referred to as an operations support system, as they support the operations of a user. In this context, an operation support system may allow a service provider to provide, monitor, control, analyze, and/or manage data services, which may be provided via a network.

Figure 1:
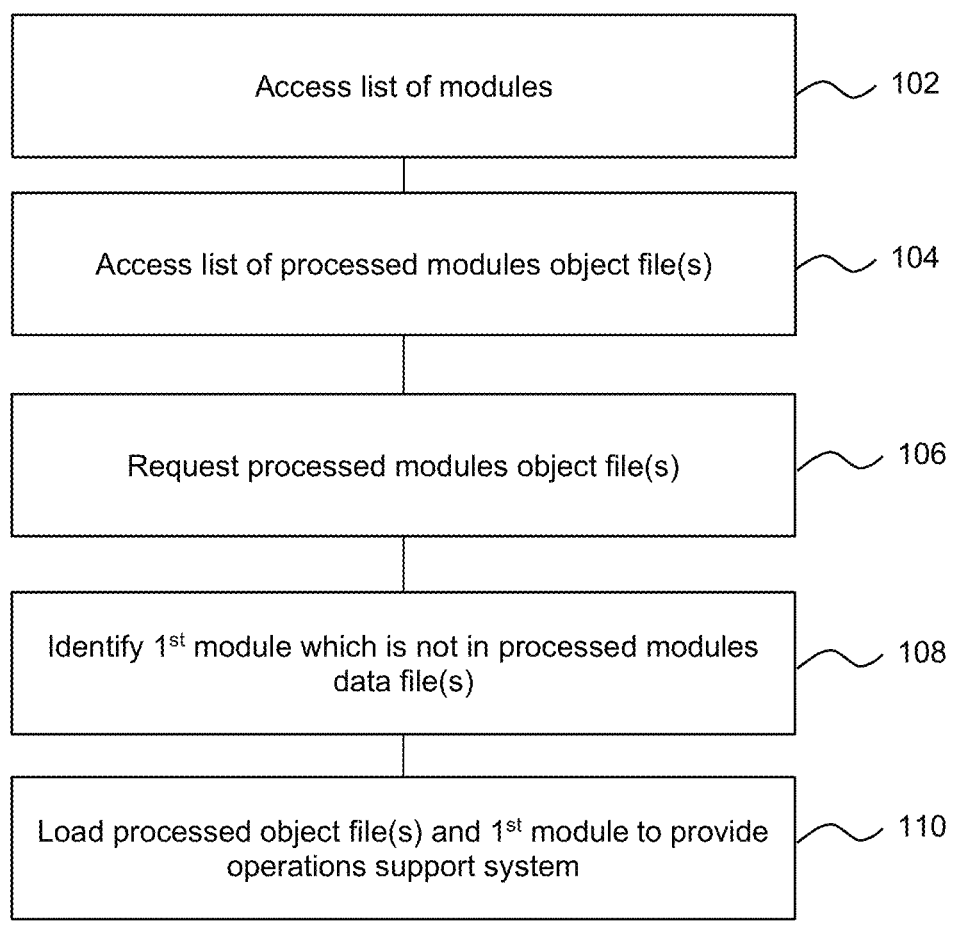
FIG. 1 is a flow chart of an example of a method for providing an operations support system.

FIG. 1 shows an example of a method, which may be a computer implemented method of initialising an operations support system providing a common access point to a plurality of data services. The common access point may be, for example, a graphical user interface (GUI) provided via a web portal, web page or the like. The common access point may provide a presentation layer for a content management system (CMS). In one example, the common access point provides a virtual 'console' to provide access to a plurality of services. For example, the common access point may provide access to a plurality of services provided by an enterprise. In some examples, the method of FIG. 1 may be carried out by client processing circuitry, for example the processing circuitry of the processing entity which is to display or otherwise provide the common access point.

The common access point may provide access to a customised or customisable set of services. This may, for example, provide a versatile interface in a web environment. In some examples, as set out herein, at least some services provided via the common access point may be provided as 'add-on' services to a core framework service, which presents the add-on services via a GUI.

In one example, the common access point may provide an access point or 'portal' for employees of an enterprise. For example, an employee may have a user profile and, based on the user profile, may be able to access data services via the common access point, which may provide centralised auditing, logging, etc. of the user's interactions, and/or may provide a convenient and in some examples consistent user interface for accessing the data services. For example this may allow access to information about that employee's personal data, such as payroll data, and/or information which the employee may use in the course of their work. The information accessible to a particular user may be based on that user's profile. For example, the common access point may provide access to financial data, sales data, sensor data, standard documentation or the like. Each of these data services may be provided as a separate service, all of which are provided via the common access point. In addition, in some examples, the common access point may provide information about how a network via which the common access point is provided, and/or which is being monitored by a service of the common access point, is performing. In some examples, network performance may be measured against a quality of service standard, or the like.

Block 102 comprises accessing a list of modules. Each module may be a data object or a data file, for example, programming to cause a processing resource to act in a certain way. The modules may comprise components or subcomponents of processing resource executable instructions intended to provide data services. In other words, a module may be a stand-alone part of a computer program, and the computer program may be composed of one or more independently developed and/or packaged modules. In some examples, a plurality of data services may make use of the same underlying module(s). Use of modules may simplify the development of computer programs and allows reuse of programming between computer programs in this way. For example, a module may comprise a menu, a menu item, a unit of data (for example, a so-called 'widget'), executable code, a specification in relation to presentation of information via a display device such as a display screen, a backend service (e.g. a database) or the like.

In this example, each module relates to a data service to be accessed via the common access point.

In some examples, the list of modules is provided as a list of dependencies of a set of data services to be provided via the common access point. The dependencies of services may be set out, for example, as a dependency tree. Such a list of dependencies may provide information concerning which modules are required to provide a particular service. As noted above, in some examples, one module may be utilised by more than one data service.

In some examples, the list of modules may be determined from a build profile for one or more add-on data services to be provided via the common access point. In one example, a first list of the modules which are dependencies of a data service can be initialised with a service build profile, and this list may be further examined to identify sub-dependencies of those modules, etc. Thus, in some examples, the list of modules may be build up recursively until complete.

In some examples, the list of modules is provided following a specific request for the list to a server. For example, the request may be an HTTP request and may result in the return of a data file, for example a json data file.

Block 104 comprises accessing a list of at least one processed modules data file, wherein the processed modules data files comprise modules which have been processed to reduce requests to a server during initialisation. For example, the list may be a list of files comprising 'bundled' modules. A bundle of modules may comprise concatenated code of a plurality of modules. In some examples, in addition or alternatively to concatenating modules, module 'minimisation' may be carried out. This may reduce the overall size of the modules, which further contributes to reducing loading times. In some examples, processing the modules may comprise applying data compression techniques. Such processing may be referred to as 'optimization' in some examples.

In some examples, at least one processed modules data file may comprise modules to provide a 'core' service of the common access point. This may be a portion of the code providing the common access point which is not open to customisation. For example, such core services may comprise portal services, global services or the like. In some examples, at least one processed modules data file may comprise modules to provide an add-on service of the common access point. For example, there may be one processed modules data file corresponding to a particular add-on service.

In some examples, the lists described in blocks 102 and 104 may be provided in response to a single request (e.g. an HTTP request) made to a server.

Block 106 comprises requesting the processed modules data files, for example from a server. For example, these may be requested with a single request per file. In general, reducing requests made to a server can significantly increase the speed of initialising the common access point. In some examples, in response to the request, the processed modules data files may be received from a server or the like and stored in a cache or some other memory resource. The requests may be made from a user device to a server.

Block 108 comprises identifying a first module from the list of modules which is not part of a processed modules data file. In some examples, the full list acquired in block 102 may be checked against the modules of the processed modules data files to determine which-if any-are missing. In some examples, this may comprise comparing the list acquired in block 102 to a list of modules which are within the processed module data files, which may in some examples be held in a cache. In some example, modules may be checked against the list as they are loaded to provide the operations support system.

Block 110 comprises loading at least one processed modules data file and the first module to provide the operations support system. In some examples, prior to loading, modules may be requested from a server and/or data files/modules may be transferred to a cache as described above, and may be loaded from the cache. In this way, in some examples, a core processed modules data file (a core bundle) (which may be pre-processed, prior to the initialisation process) and at least one add-on service processed modules data file (an add-on service bundle) may be loaded to provide the services of the common access point.

In some examples, the processed modules data files (which may be referred to as 'optimization files' in some examples) are generated by a server and stored in directories (for example, each of a plurality of 'add-on' directories of a server). Such files may be reused in a subsequent initialisation process if present, or may be regenerated if lost. In some examples, therefore, the files will be generated at the server and supplied in response to a request. In such examples, there may be one request per add-on service. However, in some examples, a client device may generate such optimization files.

In the method of FIG. 1, some modules may be pre-processed, i.e. 'pre-bundled', before initialisation begins. This may for example allow standard elements to be provided by a plurality of common access points (e.g. core services) to be pre-processed ready for initialisation. However, in order to provide a customisable and adaptable specific instance of a common access point, other modules, which may be modules associated with an add-on service which is specific to a particular instance of a common access point and/or variable between such instances, may be bundled as part of the initialisation process. In some examples, one such 'bundle' may be formed per add-on service. In some examples, each bundle includes those modules which relate to provision of the service of that bundle, and not those modules which relate to provision of another service. In some examples, some modules may be excluded from bundles, even where they relate to the service of that bundle, as is described in greater detail below.

In some examples described, not all add-on services (and/or not all modules thereof) may be subject to bundling and/or minimisation. While some services may be provided by a single bundle, other services may be provided by a single module, a plurality of discreet modules and/or by a combination of an 'incomplete' bundle and at least one module.

When considering options for providing an operations support system, one option would be to prepare a single bundle comprising all the modules to provide the system. However, such a bundle is not well-suited to bespoke systems and/or to systems which may change over time. In addition, some modules may be difficult to include in bundles.

In other examples, the modules may be requested separately for example by client processing circuitry from a server, but this will result in a high number of server requests which may in turn slow the initialisation process. Another option may be to consider loading add-on services only when they are required. However, this restricts the framework which can be used to initialise the common access point as, in at least some such frameworks (for example, AngularJS), a full set of modules may generally be registered prior to initialisation. If initialisation is attempted with anything less than a full defined set of modules, an error may result.

The method of FIG. 1 provides a further method for providing an operations support system.

Figure 2:
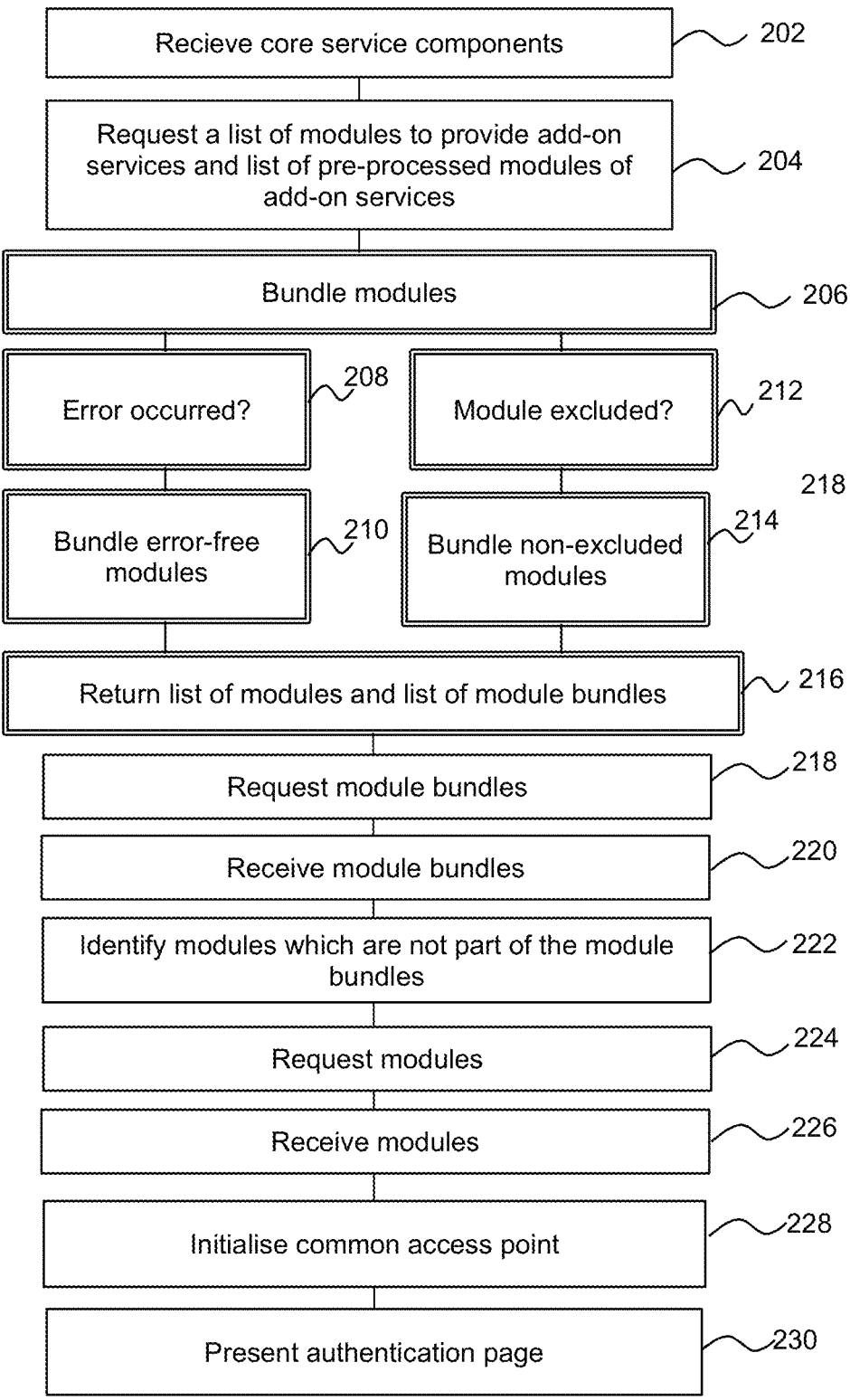
FIG. 2 is a flow chart of another example of a method for providing an operations support system.

FIG. 2 shows another example method, which may comprise a method of initialisation of a common access point to provide a plurality of data services. Block 202 comprises receiving (in some examples, loading), by processing circuitry which is to provide the common access point to the services (client processing circuitry), core service components from a server. These may comprise processed (e.g. bundled and/or optimized) data files. In other examples, these files may be received according to the methods set out below for the add-on services.

Block 204 comprises requesting, by the client processing circuitry and from the server, a list of modules to provide add-on services and a list of processed (i.e. bundled and/or optimized) modules of the add-on services. This may for example comprise a single HTTP request, as described above in relation to block 102 and 104.

Blocks 206 to 216 may be performed by a server (and thus may be considered to comprise a separate method, and/or a method which may be provided and/or administered independently of the method of the other blocks). In block 206, the server at least attempts to bundle or optimize files to provide the add-on service. In some examples, at least the core services may be 'pre-processed' before initialisation. In some examples, some or all of the add-on service(s) may also be pre-processed. However, in this example, some or all of the add-on service(s) may also be bundled as part of the initialisation method. This promotes use of the latest version of the modules, ensures the specification of the common access point is current, and the like.

Bundling the modules may comprise optimizing the code to provide the add-on service(s) to reduce the number of requests made to a server on download and/or to reduce the amount of data downloaded from the server, and/or the time and/or resources associated with the download. This may comprise concatenating, minimising, and the like. For example, code comments (i.e. code portions which are not part of the instructions to a processing apparatus, but instead serve to explain the code, provide copyright notices, identify code sources and or the like) may be removed in some minimisation processes. In some examples, the processing may be customised. The bundling may, for example, comprise applying uglify or uglify2 techniques.

In some cases, bundling may result in an error, and/or some files may be excluded from bundling. To consider errors first, if it is determined, in block 208 that an error has occurred, the rest of the modules for a particular add-on service may be bundled to form a data file in block 210. In other words, an add-on service may be provided by a bundle of modules and at least one module which has not been included in the bundle, for example because an error was encountered. For example, such an error may result when there is an invalid JavaScript source that is used to compute the dependencies. In such cases, the bundle may be generated so as to exclude that module in block 210.

If it is determined in block 212 that a module is to be excluded from bundling, the non-excluded modules for a particular add-on service may be bundled to form a data file in block 214. For example, modules which are excluded from bundling may comprise modules associated with 'open source' software. In general, such software may be provided with the core service components and therefore they may be excluded to prevent redundant data transfer and thereby reduce the overall amount of data transferred. Modules which have been included in another bundle, and/or modules which have previously resulted in a bundling error, may also be excluded in some examples. In some examples, modules which are shared by more than service may be excluded from a bundle, which may again prevent data from being transferred in more than one bundle and thus reduce redundant data transfer. In other examples, excluded modules may be user-specified.

In block 216, the server returns the list of modules and the list of existing processed module bundles as requested in block 204, which may include any newly formed bundles. In other examples, the list may include a list of all add-on services.

In block 218, the client processing circuitry requests the processed modules and these are received from the server in block 220 and placed in a local web cache. Block 222 comprises identifying, by the client processing circuitry, modules which are not part of the bundled modules—i.e. are not held in the local cache (or viewed another way, the 'missing' modules to provide the services), and block 224 comprises requesting those modules individually from the server. In some examples the modules may be loaded from the cache to provide the data services, and the list of modules may be checked against the full list of modules to provide those services. The request(s) for modules may comprise HTTP requests. In some examples, one request may be sent for each module. The modules are received in block 226 and the code to provide the common access point may thereby be completed. Block 228 comprises initialising the common access point to provide the services. In block 230, an authentication page is presented to an end-user of the common access point as a GUI, and the common access point is ready for use.

The bundling process allows for requests made to the server to, at least potentially, be reduced to one-per-bundle rather than one-per-module, and may therefore result in an increased speed of initialisation compared to a system in which bundling is not carried out on initialisation. However, the system remains flexible in that the add-on services may be provided, in some examples via bundles formed as part of the initialisation method, but in the event that modules are missing from the bundles, these may be acquired individually.

In some examples, the modules may be associated with data access paths and/or maps, and the dependencies between the modules may be defined with reference thereto. In some examples, the dependencies may be 'shim' dependencies. So called shim dependencies may specify specific dependencies which may not be apparent from analysis of the modules themselves, for example those relating to code produced by a different source than the other modules (for example, an open source module of an otherwise proprietary code based add-on service). Other (non-shim) dependencies can, in some examples, be derived from analysis of the modules.

In some examples, a bundling profile may be generated for an add-on service. This may include any or any combination of file paths, shim dependencies, derived dependencies, maps and the like as well as list of modules to include and, in some examples a list of modules to exclude. This may result in a bundling profile (for example a file type build.json) associated with an add-on service identifier.

In some examples, a bundling profile may be generated automatically. In some examples, a bundling profile may be manually generated and/or customized. For example, this may be the case for modules with an unexpected name (for example names which do not follow a naming convention), modules which will not operate within the bundling process (such modules may be included in an 'exclude' list), external dependencies between add-on services and the like. In some examples, any shared modules may be excluded from at least one of the bundles which utilizes the module to avoid data being redundantly transferred. For example, if it can be assumed that the shared module is available from a bundle for a first add-on service, it may be excluded from a bundle for a second add-on service. Thus, in general, a module may be excluded in a particular bundle profile either because they will be downloaded with the core services or another bundle.

In some examples, a module may be excluded from a bundle profile if it is known that the module will not 'bundle' or optimize properly, and/or will likely result in an error on bundling/optimization. In some examples, if a module has resulted in a bundling error (in some examples, consistently during a number of attempts at bundling), that module may be marked for exclusion in subsequent bundling attempts.

Generating the bundling profile may require the definition of new paths, shims maps and the like. In some examples, a bundling format may be specified.

In some examples, a bundling process may be enforced for at least one add-on service in initialising the common access point. In some examples, a bundling process may not be required for a particular add-on service, for example if it does not contain any executable code (for example the add-on service could relate to layouts or themes, and in such cases there may be no executable code) and therefore optimization/bundling is not required. In some examples, for example if no bundling profile exists, bundling may not be carried out for a particular add-on service. In other examples, bundling may not be carried out because a bundled set of modules of a particular add-on service is already available.

Figure 3:
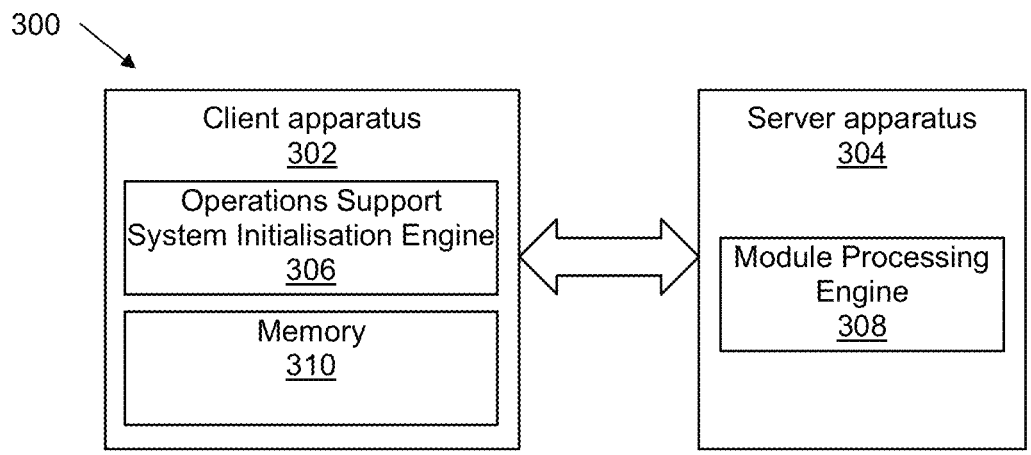
FIG. 3 is an example of operations support system data processing apparatus.

FIG. 3 shows an example of an operations support system data processing apparatus 300 comprising, in this example, a client apparatus 302 and a server apparatus 304. The client apparatus 302 comprises an operations support system initialisation engine 306 and the server apparatus 304 comprises a module processing engine 308. It will be understood that the client apparatus 302 and the server apparatus 304 may be provided, administered, manufactured and/or provisioned separately from one another, for example by different commercial entities. In other examples, the functionality described herein may be provided by a single entity. In another example, the operations support system data processing apparatus 300 may comprise just the client apparatus 302, or just the server apparatus 304.

The operations support system data processing apparatus 300 is to provide an operations support system, which provides a plurality of data services, in some examples via a common access point as described above. The data services comprise core data services and at least one add-on data service. The core data services are provided via data files which are processed for efficient deployment (e.g., in some examples, bundled) and at least one add-on data service is associated with a set of modules.

In this example, the operations support system initialisation engine 306 is provided in a web browser as part of client apparatus 302 and the module processing engine 308 is provided as part of a remote server apparatus 304. The client apparatus 302 in this example comprises a memory 310, which in this example comprises a web cache for (for example temporarily, in a volatile manner) storing data files. In other examples, the memory 310 may comprise some other form of memory, including non-volatile memory.

In one example, the client apparatus 302 may comprise a user device, for example, a laptop, mobile telephone, tablet computer, desktop computer, or the like or another device such as a kiosk, a point of sales device and the like. A user may access the operations support system via the client apparatus 302.

In use of the operations support system data processing apparatus 300, the operations support system initialisation engine 306 in this example determines, during initialisation of the operations support system, if any data service to be provided is associated with a module which is not part of a module bundle data file for that service and requests bundled data files and any module which is not in a module bundle data file separately as part of the initialisation of the operations support system.

In one example, the operations support system initialisation engine 306 requests and obtains, during initialisation of the operations support system, (i) data describing the dependencies of the services it is intended to provide, and (ii) data describing of any existing add-on and/or core service bundles held by the server apparatus 304. This data may be requested and/or obtained from the server apparatus 304.

Based on the data, the operations support system initialisation engine 306 requests the core services bundle and any described add-on service module bundle data file (in some examples, sending one request per add-on service to the server apparatus 304).

These module bundle data files are provided from the server apparatus 304 and may be stored in the memory 310. The operations support system initialisation engine 306 may analyse the data describing the dependencies of the services it is intended to provide. If the modules are available as part of a bundle held in the memory 310, then these files may be loaded from the memory 310 in due course in order to provide a service or the operations support service. If however the module/file is absent (for example, because it is excluded, or because bundling failed), then the operations support system initialisation engine 306 sends a specific request for a missing module/file to the server apparatus 304.

In some examples, the module processing engine 308 of the server apparatus 304 may generate bundles in response to a request from the operations support system initialisation engine 306 for the data describing the services the client apparatus 302 is to provide. This may comprise carrying out optimization/bundling as described in relation to FIG. 1 or FIG. 2. In some examples, this may comprise minimising modules and/or concatenating modules. In some examples, compression techniques such as 'zip' techniques may also be applied as part of the processing. This may reduce data to be transferred between the client apparatus 302 and the server apparatus 304.

In some examples, the module processing engine 308 provides an indication of whether a processing of the module has succeeded and, when the processing has succeeded, the operations support system initialisation engine 306 is to receive the processed module and, when the processing has not succeeded, the operations support system initialisation engine 306 is to receive the unprocessed module.

This allows an add-on service to be provided in two ways: with processed (e.g. bundled) modules where bundling is successful, and with at least one 'unbundled' module where bundling has not (or has not fully) succeeded. In some examples, where one module fails to be bundled, the rest of the files may nevertheless be bundled so as to minimise requests. There may be one request to the server apparatus 304 per bundle and one request to the server apparatus 304 per 'missing' module.

In some examples, the operations support system initialisation engine 306 is to store modules in the memory 310 and to check the memory 310 for the modules prior to making a request for an add-on service and thereby, in some examples, causing module processing engine 308 to process any such module as part of the initialisation of the operations support system. Where a module has already been provided to the memory 310 (e.g. a web cache)—and is held therein—it may not be requested again. This may therefore further reduce communications between a client apparatus 302 and a server apparatus 304, and therefore may assist in increasing a speed of initialisation.

The engines 306, 308 may be any combination of hardware and programming to implement the functionalities of the engine(s). In examples described herein, such combinations of hardware and programming may be implemented in a number of different ways. For example, the programming for the engines 306, 308 may be processing resource executable instructions stored on at least one non-transitory machine-readable storage medium and the hardware for the engines may include at least one processing resource to execute those instructions. In some examples, the hardware may also include other electronic circuitry to at least partially implement at least one of the engine(s) 306, 308. In some examples, at least one machine-readable storage medium may store instructions that, when executed by the at least one processing resource, at least partially implement some or all of the engine(s) 306, 308. In such examples, a computing device at least partially implementing the operations support system data processing apparatus 300 may include the at least one machine-readable storage medium storing the instructions and the at least one processing resource to execute the instructions. In other examples, the engine(s) 306, 308 may be implemented by electronic circuitry.

Figure 4:
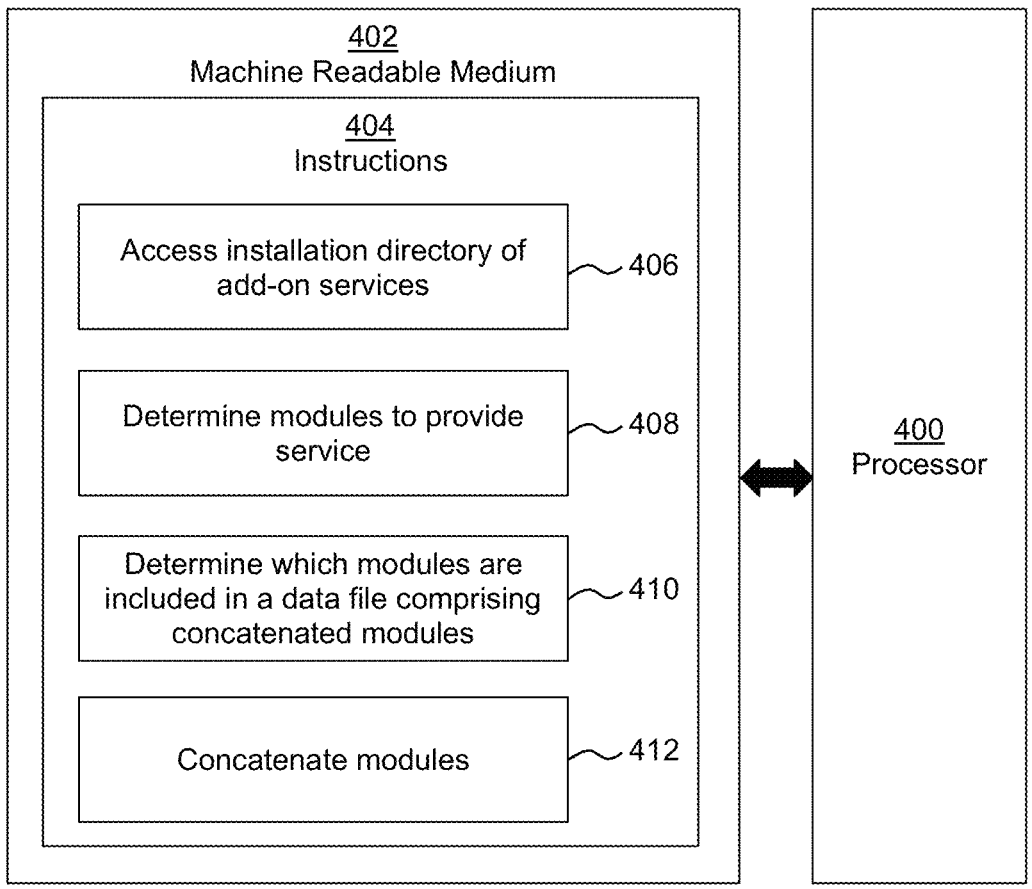
FIG. 4 is a representation of a machine readable medium in association with a hardware processor.

FIG. 4 shows a machine readable medium 400 (which may be tangible and/or non-volatile) in association with a processor 402. The machine readable medium 400 stores instructions 404 which when executed by the processor 402 cause the processor 402 to carry out processes. The instructions 404 comprise instructions 406 to cause the processor 402 to access an installation directory of a plurality of add-on services to an operations support system, instructions 408 to cause the processor 402 to determine a plurality of modules to provide the services (this may provide the list described in relation to block 102 above), instructions 410 to cause the processor 402 to determine which of the modules are included in a data file comprising concatenated modules (e.g. a processed modules data file as described above); and instructions 412 to cause the processor 402 to, for at least one module which is not included in a data file, acquire the module separately from the data file.

In some examples, determining the plurality of modules comprises accessing a build profile of the service. In some examples, the machine readable medium 400 further comprises instructions to cause the processor 402 to load at least one data file.

The machine readable medium 400 and the processor 402 may be any combination of hardware and programming to implement the described functionalities. In examples described herein, such combinations of hardware and programming may be implemented in a number of different ways. For example, programming may be processing resource executable instructions stored on at least one non-transitory machine readable storage medium and the hardware may include at least one processing resource to execute those instructions. In some examples, the hardware may include electronic circuitry to at least partially implement the processor 402.

In examples described herein, a processing resource such at the processor 402 or the processing apparatus 300 may include, for example, one processing resource or multiple processing resources included in a single computing device or distributed across multiple computing devices. As used herein, a "processing resource" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine readable storage medium, or a combination thereof.

In examples described herein, entities may communicate with one another via direct connections, via one or more computer network, or a combination thereof. In examples described herein, a computer network may include, for example, a local area network (LAN), a virtual LAN (VLAN), a wireless local area network (WLAN), a virtual private network (VPN), the Internet, or the like, or a combination thereof.

In examples described herein, a memory resource such as the memory 310 or the machine readable medium 400 may include, for example Random Access Memory (RAM), including any variant thereof (e.g. DRAM, SRAM, etc.).

Examples in the present disclosure can be provided as methods, systems or machine readable instructions, such as any combination of software, hardware, firmware or the like. Such machine readable instructions may be included on a machine readable storage medium (including but not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and/or block diagrams, as well as combinations of the blocks in the flow charts and/or block diagrams can be realized by machine readable instructions.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other processing resource may fulfil the functions of several units recited in the claims.

The features of any dependent claim may be combined with the features of any of the independent claims or other dependent claims, in any combination.

The invention claimed is:

1. A method comprising, in initialising an operations support system providing a common access point to a plurality of data services:
   accessing a list of modules, each module relating to at least one of a plurality of data services to be accessed via the common access point;
   accessing a list of at least one processed modules data file, wherein each processed modules data file comprises bundled modules;

requesting the processed modules data files;
identifying a first module from the list of modules which is not part of a processed modules data file; and
loading at least one processed modules data file and the first module to provide the operations support system.

2. A method according to claim 1 wherein the list of modules includes modules dependent on one another to provide a service provided by the operations support system.

3. A method according to claim 1 in which identifying a first module from the list of modules which is not part of a processed modules data file comprising checking a cache holding the processed modules data files for the first module, the method further comprising, if the first module is not held in the cache, requesting the first module from a server.

4. A method according to claim 1 comprising processing at least one module to generate a processed modules data file in response to a request for a list of at least one processed modules data file.

5. A method according to claim 4 comprising excluding at least one module relating to a particular data service of the plurality of data services from the processed modules data file.

6. A method according to claim 5 comprising identifying an error in processing a module in generating the processed modules data file, and excluding the module causing the error from the processed modules data file.

7. Operations support system data processing apparatus comprising an operations support system initialisation engine,
wherein the operations support system data processing apparatus is to provide an operations support system comprising a plurality of data services, the data services comprising core data services and at least one add-on data service, wherein the core data services are provided via bundled data files;
wherein at least one add-on data service is associated with a set of modules and the operations support system initialisation engine is to determine, during initialisation of the operations support system, if any data service to be provided is associated with a module which is not part of a module bundle data file for that service; and
to request module bundle data files and any module which is not in a module bundle data file separately as part of the initialisation of the operations support system.

8. Operations support system data processing apparatus according to claim 7 further comprising a memory, wherein the memory is to store at least one module bundle data file and the operations support system initialisation engine is to analyse the module bundle data files in the memory to determine if any data service to be provided is associated with a module which is not stored in the memory prior to requesting the module.

9. Operations support system data processing apparatus according to claim 7 further comprising a module processing engine to generate at least one module bundle data file in response to a request from the operations support system initialisation engine.

10. Operations support system data processing apparatus according to claim 9 in which the operations support system initialisation engine is to check, prior to causing the module processing engine to generate a module bundle data file, if a module of the set of modules is associated with an instruction not to process the module of the set of modules.

11. Operations support system data processing apparatus according to claim 9 wherein generating at least one module bundle data file comprises at least one of minimising modules and concatenating modules.

12. Operations support system data processing apparatus according to claim 9 wherein generating at least one module bundle data file comprises data compression.

13. A non-transitory machine readable medium comprising instructions which when executed by a processor cause the processor to:
access an installation directory of a plurality of add-on services to an operations support system;
determine a plurality of modules to provide the add-on services;
determine which of the modules are included in a data file comprising concatenated modules; and
for at least one module which is not included in a data file, acquire the module separately from the data file.

14. The non-transitory machine readable medium according to claim 13 wherein determining the plurality of modules comprises accessing a build profile of at least one service.

15. The non-transitory machine readable medium according to claim 13 further comprising instructions to cause the processor to load at least one data file.

* * * * *